Aug. 12, 1924.
J. A. ROBERTSON ET AL
1,504,977
FILM ROLL SUPPORT FOR CAMERAS
Filed Sept. 8, 1922
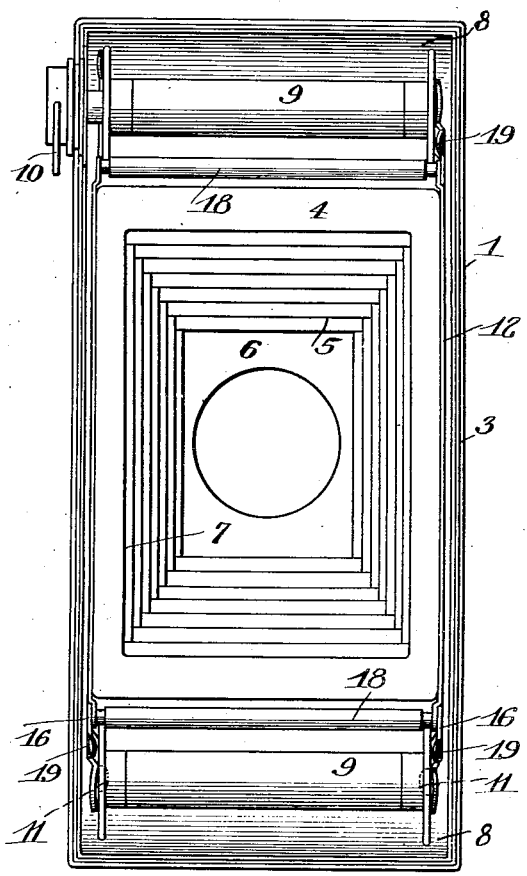
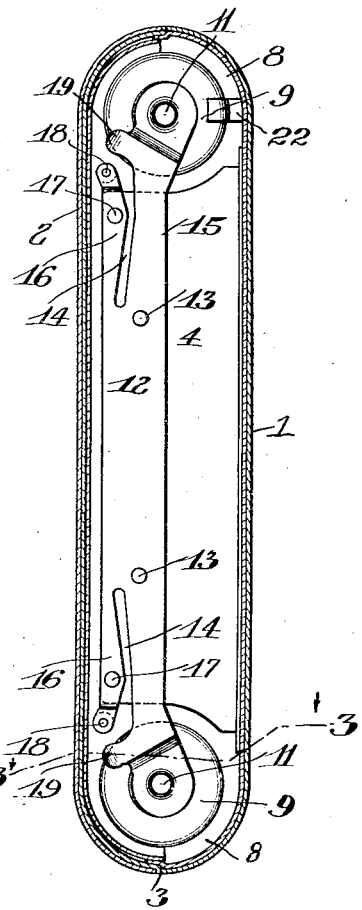
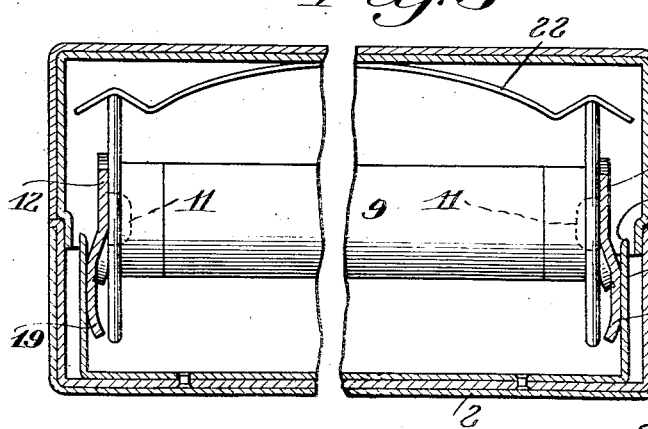
INVENTOR.
John A. Robertson
Robert Kroedel
BY
their ATTORNEY Patented Aug. 12, 1924.

1,504,977

UNITED STATES PATENT OFFICE.

JOHN A. ROBERTSON AND ROBERT KROEDEL, OF ROCHESTER, NEW YORK, ASSIGNORS TO EASTMAN KODAK COMPANY, OF ROCHESTER, NEW YORK, A CORPORATION OF NEW YORK.

FILM-ROLL SUPPORT FOR CAMERAS.

Application filed September 8, 1922. Serial No. 586,987.

*To all whom it may concern:*

Be it known that we, JOHN A. ROBERTSON and ROBERT KROEDEL, citizens of the United States, residing at Rochester, in the county of Monroe, State of New York, have invented new and useful Improvements in Film-Roll Supports for Cameras, of which the following is a specification.

Our present invention relates to photography and more particularly to photographic cameras or film roll holders therefor and it has for its object to provide such cameras or roll holders with simple, efficient and convenient spool or film support that can be readily manipulated to insert or remove the film but which are securely locked in operative or supporting position when the camera is closed and the spools are in use. To these and other ends the invention consists in certain improvements and combination of parts all as will be hereinafter more fully described, the novel features being pointed out in the claims at the end of the specification.

In the drawings:

Figure 1 is a rear view of a film camera with back removed and provided with film roll support constructed in accordance with and illustrating one embodiment of our invention.

Figure 2 is a sectional view through the camera in the plane of the inner face of one of the side walls.

Figure 3 is an enlarged transverse section partly broken away on the line 3—3 of Figure 2.

Similar reference numerals throughout the several views indicate the same parts.

We have illustrated our invention in its present embodiment in connection with a roll holding pocket hand camera of a familiar type comprising a body 1 and a removable back 2 cooperating with the body on a median line of the camera in connection with the provision of light sealing devices 3. Supported within the body by its front wall only so as to be spaced at all other points from the walls of the shell or casing is a frame 4 constituting the bellows chamber for housing the bellows 5 and lens board 6 and also extending rearwardly to define the exposure opening 7 of the camera in the focal plane thereof.

The top and bottom walls of the frame 4 in conjunction with the corresponding walls of the body and back form film chambers 8 containing the usual film spools 9. The chambers become accessible for the insertion and removal of these spools by removing the back 2 and one of the spools is made the winding spool through the provision of the usual winding key 10 having the usual axial movement into and out of interlocking engagement with the spool.

Otherwise than this the two spools are supported upon dead centers 11 also having an endwise movement with reference to the spool for engagement and disengagement therewith and in the practice of our invention we mount these dead centers or trunnion bearings in an improved manner, the centers for the corresponding ends of both spools being formed on a single element. Such element consists of a thin spring metal or similar plate 12 secured at points removed from its ends to the side of the frame 4 as by rivets 13. The ends are bifurcated at 14 to form two arms 15 and 16. The arm 15 carries the center 11 and is laterally flexible to permit such center to be moved by the fingers into and out of engagement with the spool 9 while the arm 16 is riveted at 17 to provide a fixed bearing support for the guide roll 18 over which the film from or to the spool is drawn in proper relationship to the exposure opening 7.

The space between the inner frame 4 and the side walls of the camera shell gives room for the lateral play of the arms 15 and while it is preferable that the tension on the arms be so set as to tend to carry the centers 11 into the spool ends they are normally inoperative to insure a firm bearing for the spool, particularly when the latter is under strain, when the back 2 is removed at which time the spools are easily inserted and removed, usually by manipulation of the spool itself without touching the fingers directly to the arms 15. We make arrangements however, whereby the application of the back 2 to the camera insures the proper firm engagement of the spool centers with the spool to which end there is formed on each arm 15 a cam portion 19 constituted, in the present instance, by an ear or extension having the cross sectional form shown in Figure 3. The back 2, in connection with the light seal 3 is usually fitted with an inner spaced flange 20 and we utilize this flange to engage the cam ear 19 when the back is applied to the body and to force it inwardly as shown in Figure 3 so that the arm 15 and its center 11 are carried in to firm and definite engagement with the spool and maintained there while the camera is closed and the spools are in operation or ready for use. The inner edges of the flanges 20 are preferably beveled as shown at 21 to aid this action. When the back is removed again the control over the spool supports is automatically released.

The end friction of the arms 15 may be utilized to retard the rotation of the spools and prevent over-running but we have shown additional spring devices 22 bearing on the periphery of the spool flanges for this purpose.

We claim as our invention:

1. In a camera, the combination with a camera body comprising a shell and an inner frame spaced from the walls of the shell, of a bifurcated strip of resilient material mounted on the side of the frame and providing two arms, one of which is laterally flexible and fitted with a film spool center and the other of which furnishes a fixed bearing support for a guide roll for film supported on the film spool center.

2. In a camera, the combination with a camera body and a displaceable back cooperating therewith, of film spool supports within the body having normally inoperative film winding positions but held in operative positions by the back.

3. In a camera, the combination with a camera body and a displaceable back cooperating therewith, of resilient film spool supports within the body having normally inoperative film winding positions but actuated to operative positions by the application of the back.

4. In a camera, the combination with a camera body and a displaceable back cooperating therewith, of resilient film spool supporting arms within the body having normally inoperative film winding positions, said arms and the backs being provided, respectively, with cooperating cam members adapted to engage and to actuate the supporting arms to operative positions when the back is applied to the body.

5. In a camera, the combination with a camera body and displaceable back cooperating therewith, of resilient film spool supporting arms within the body having normally inoperative film winding positions and provided with cam portions and flanges on the back adapted to cooperate with the cam portions to actuate the arms to operative positions.

6. In a camera, the combination with a camera body and a displaceable back cooperating therewith, of film spool supporting arms within the body having normally inoperative film winding positions and cam mechanism for automatically actuating the arms to operative position when the back is applied to the body.

7. In a camera, the combination with a camera body having film spool supports therein adapted to be moved into and out of endwise engagement with a film spool, of a displaceable back for the body and means therein for automatically locking the supports against disengagement when the back is applied to the body.

8. In a camera, the combination with a camera body having film spool supports therein adapted to be moved into and out of endwise engagement with a film spool, of a displaceable back for the body, the back and film spool supports being provided with yieldingly cooperating cam devices operating to maintain the spool supports in engagement with a spool when the back is in place on the body.

JOHN A. ROBERTSON.
ROBERT KROEDEL.